No. 775,580. PATENTED NOV. 22, 1904.
W. RIGGS.
DECOY DUCK.
APPLICATION FILED SEPT. 6, 1904.
NO MODEL. 2 SHEETS—SHEET 1.

Witnesses
J. G. Finkel
Thos. Howe

Inventor
Whittaker Riggs
by Foster Freeman & Watson
Attorneys

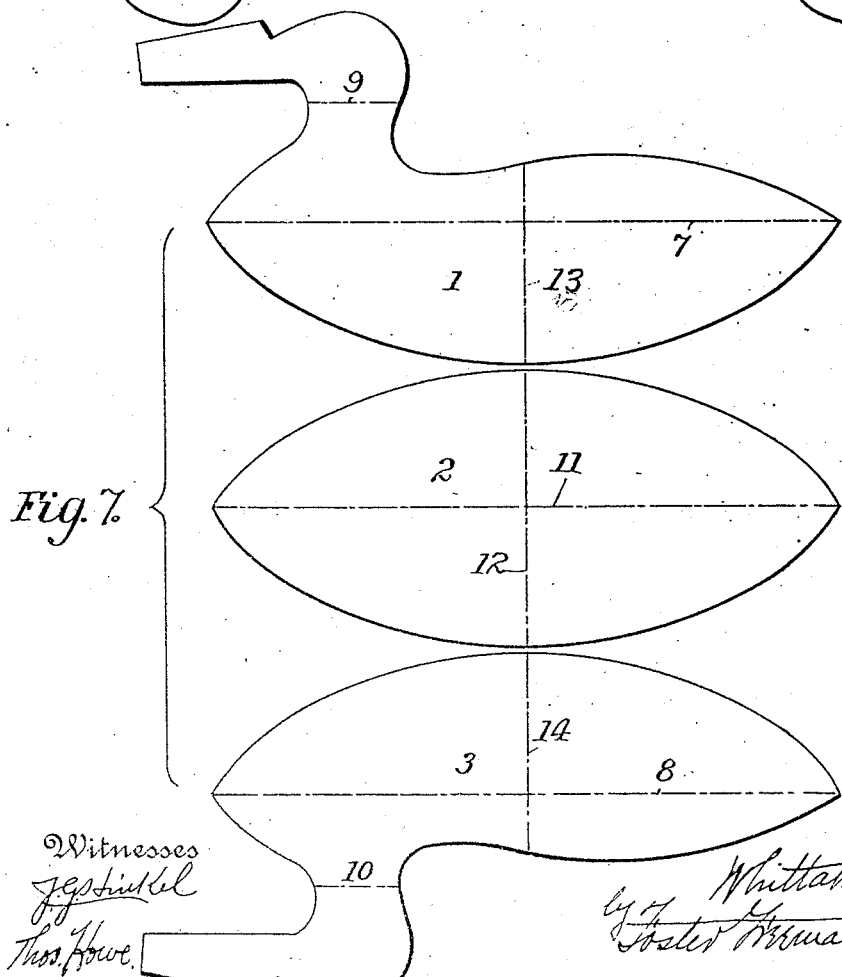

No. 775,580. Patented November 22, 1904

UNITED STATES PATENT OFFICE.

WHITTAKER RIGGS, OF NEW ORLEANS, LOUISIANA.

DECOY-DUCK.

SPECIFICATION forming part of Letters Patent No. 775,580, dated November 22, 1904.

Application filed September 6, 1904. Serial No. 223,466. (No model.)

*To all whom it may concern:*

Be it known that I, WHITTAKER RIGGS, a citizen of the United States, residing at New Orleans, in the parish of Orleans, State of Louisiana, have invented certain new and useful Improvements in Decoy-Ducks, of which the following is a specification.

This invention relates to devices used by sportsmen to attract water-fowl, which are commonly known as "decoys" and usually take the form of ducks or geese. They may, however, have other forms suitable to the nature of the game to be attracted.

It is one object of my invention to provide a decoy which shall be so constructed that when it is distended it will remain in that state without the aid of fluid confined within its interior and without the aid of auxiliary braces.

It is a further object of the invention to provide a decoy which may be readily folded into small compass for storage or shipment.

It is a further object of the invention to lessen the cost of articles of the character described.

It is a further object of the invention to provide a decoy comprising a light and inexpensive anchor, such that where the body of the decoy is of very light material, as when constructed in accordance with the present invention, the anchor will not prove burdensome.

It is a further object of the invention to provide a light and inexpensive means for preventing the overturning of the decoy.

Further objects of the invention will be apparent from the description of the invention, in connection with the accompanying drawings, of which—

Figure 1:
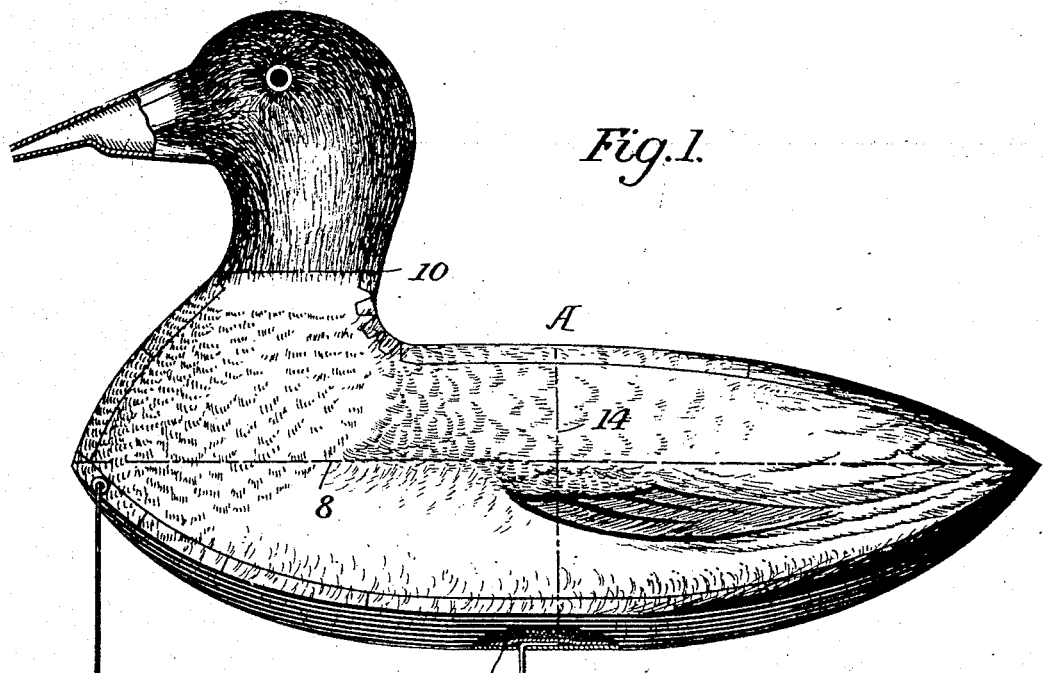
Figure 2:
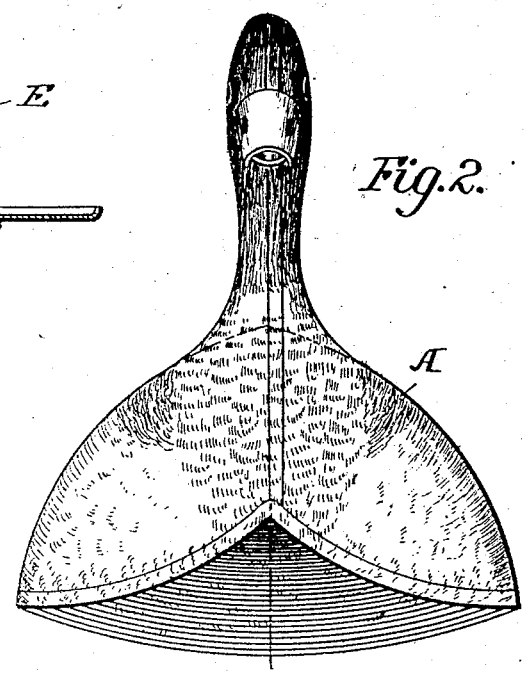
Figure 8:
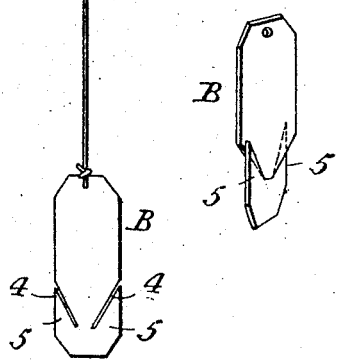
Figure 3:
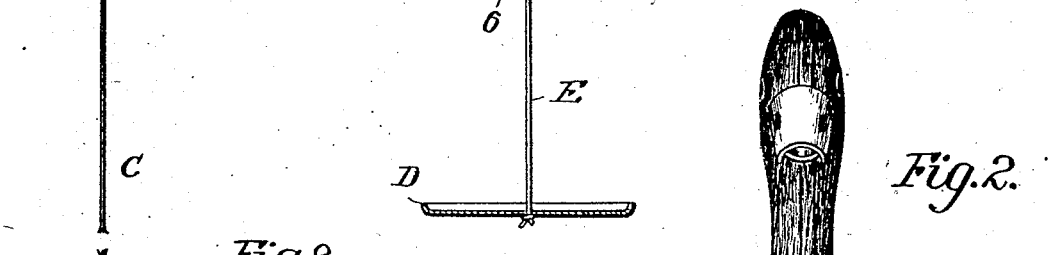

Figure 1 is a side view of a complete decoy in condition for use. Fig. 2 is a front end view of the decoy. Fig. 3 is an end view of the decoy partially folded. Figs. 4, 5, and 6 illustrate the decoy at different stages of the folding. Fig. 7 shows the blanks or sections of which the decoy is constructed, and Fig. 8 is a perspective view of the anchor in condition for use.

Referring to the accompanying drawings, it will be seen that the decoy comprises the decoy proper or body, such as the duck A, to which is secured an anchor B by means of a flexible cord C, and a light disk D, suspended from the body by a flexible cord E. The body A is constructed from three sections or blanks 1, 2, and 3, which may be cut, stamped, or otherwise formed from paper sheets. The side sections 1 and 3 form the sides and upper portion of the body and each comprises substantially an oval portion, to which are secured portions forming one-half the head, neck, and bill. The section 2 forms the bottom of the body and is of substantially oval form. The sections 1, 2, and 3 are secured together by overlapping adjacent edges, as shown in Figs. 1 and 2, and pasting the edges together. While I have specified paper as the material of which the body is to be formed, it will be obvious that other material might be employed, it being requisite only that the material should be of such flexibility as to avoid danger of breakage in handling and to prevent it from being clumsy, while at the same time being stiff enough so that the body will hold its shape after it has been distended.

The securing of the sections together by pasting is of peculiar value in connection with apparatus of the character under consideration for the reason that it furnishes a substantially air-tight construction. While it is true that it is not intended that fluid of any kind shall be confined within the body to maintain it distended, yet the most approved means of distending the body in the first instance is by inflating it, preferably through the beak. In previous constructions, so far as known, it is not attempted to secure the sections of a decoy together by pasting. Moreover, in devices heretofore proposed such procedure would be impracticable, for the reason that the material from which the sections are cut has been waterproofed, and if this material were pasted together the action of the water upon the decoy would soon cause it to fall apart. According to the present invention the sections are first pasted together and the whole is then rendered waterproof by a coating of paraffin, wax, oil, or other suitable substance. Thus the pasted joints are protected from the action of the water.

When complete, the body exhibits coloring which simulates that of the water-fowl to be ,racted. This coloring can be most inexpensively applied by printing, and within the term "printing" I desire to include all means for applying color by imprinting, such as by means of a color-press, by lithographing, or by other similar means. This has heretofore been impracticable, for the reason that the bodies were so formed that they could not be passed through a printing-machine or were constructed of waterproofed material on which printers' ink would not take. According to the present invention, however, as the body is not waterproofed until after it has been constructed the blanks, which are flat thin sheets, may readily have the desired designs printed thereon. Reference to Figs. 1 and 2 will show that the body of the decoy is so constructed that when it is distended the various parts mutually brace each other to hold it in that condition.

The anchor B comprises a strip of thin material in which are cut the diagonal slots 4. When it is desired to prepare the anchor for use, the wings 5, formed by the slots 4, may be bent in opposite directions to positions as shown in Fig. 8. If the decoy be then placed in the water, the anchor will descend to the bottom and the wings will engage with grass or other objects with which they come in contact and serve to anchor the body in position. The plate D, which, as before stated, serves the purpose of preventing the overturning of the body, hangs but a few inches below the body and is in no sense an anchor. This plate consists of a thin disk having upwardly-turned edges, as shown in Fig. 1. The cord E, which secures the disk, passes through a hole in the bottom of the body and is secured by means of a strip of paper 6 or other suitable material pasted over the end of the cord E upon the interior of the body. This forms a secure and cheap means for attaching the cord and also serves the purpose of making tight the hole through which the cord passes.

In order that the body may be folded, longitudinal creases 7 and 8 are formed upon each side, while creases 9 and 10, substantially parallel to the creases 7 and 8, are formed in the neck-sections. There is also formed a longitudinal crease 11 centrally through the bottom section. The portion in the completed decoy which is included between the creases 7 and 8 may be referred to as the "longitudinal central section." It will be obvious that by folding along the creases 7 and 8 the body may be made to assume a position as shown in Fig. 3, in which the two sides of the longitudinal central section are folded together in a vertical position, while the portions of the side sections outside the longitudinal central section are superposed upon the bottom section. The longitudinal central section may then be folded either to the right or left, when the body in plan view will appear as in Fig. 4, the head occupying the position shown in dotted lines. The head may then be folded inwardly about the creases 9 and 10 to the position shown in full lines in Fig. 4. One half of the bottom portion, with its superposed portion of a side section, may then be folded in upon the other half of the bottom section, when the body will appear as shown in Fig. 5. The transverse folding of the body is then complete. Longitudinal refolding, however, whereby the length is diminished, may be permitted by means of transverse creases 12, 13, and 14, in the sections of which the body is composed and located about midway of their ends.

Without being limited to the precise construction shown, what I claim is—

1. As an article of manufacture, a decoy having a foldable body of stiff material adapted when unfolded and distended to remain of itself in such state, for the purpose set forth.

2. As an article of manufacture, a decoy having a foldable body of stiff material provided with a bottom portion, a longitudinal central portion adapted to be pressed flat against the bottom portion, and a head adapted to be pressed flat against the superposed longitudinal central and bottom portions, for the purpose set forth.

3. As an article of manufacture, a decoy having a foldable body of stiff material provided with a bottom portion, a longitudinal central portion adapted to be pressed flat against the bottom portion, and a head adapted to be pressed flat against the superposed longitudinal central and bottom portions, the said body in virtue of its being formed of stiff material being calculated when unfolded and opened or distended to remain of itself in such state, for the purpose set forth.

4. As an article of manufacture, a foldable decoy having a body comprising parts composed of stiff material and coöperating to maintain the said body distended after it has been placed in distended condition, for the purpose set forth.

5. As an article of manufacture, a foldable decoy comprising a body of stiff material, the said body comprising parts coöperating to maintain the decoy distended after it has been placed in distended condition, the interior of said body being permanently open to the atmosphere, for the purpose set forth.

6. As an article of manufacture, a decoy that can be folded and refolded comprising a body of stiff material having longitudinal creases such that it may be folded, and transverse creases such that it may be refolded, for the purpose set forth.

7. As an article of manufacture, a decoy composed of material having colors to simulate the plumage of a fowl printed thereon and waterproofed over the printed colors whereby a waterproof structure is obtained without interfering with the application of the printer's ink, for the purpose set forth.

8. As an article of manufacture, a decoy comprising sections of thin stiff material secured together at their edges, said sections comprising a bottom and two side sections, each of said side sections composing one-half of the side of the body and one-half of the neck and head, for the purpose set forth.

9. As an article of manufacture, a decoy comprising sections of thin material secured together at their edges, said sections comprising an oval bottom section and two side sections, each side section having a substantially oval portion adapted to form one side of the body, and portions adapted to form one side of the head and neck, for the purpose set forth.

10. As an article of manufacture, a decoy formed of thin stiff material having a longitudinal crease upon each side and upon the bottom such that the decoy may be folded, and a transverse crease upon each side and upon the bottom whereby the decoy may be refolded, for the purpose set forth.

11. As an article of manufacture, a decoy formed of thin stiff material having longitudinal creases upon each side and upon the bottom and a crease transverse to the neck whereby the decoy may be folded, and a transverse crease upon each side and upon the bottom whereby the decoy may be refolded, for the purpose set forth.

12. As an article of manufacture, the combination with a hollow decoy constructed of light material, of means for preventing overturning of said decoy consisting of a light thin plate suspended in a horizontal position from said decoy by a flexible connection, the said plate being of large extent relative to its weight whereby the pull upon said connection due to the weight of said plate is insignificant in comparison with the pull exerted upon said connection by the resistance of the water to the passage of the plate therethrough when the decoy starts to overturn, for the purpose set forth.

13. As an article of manufacture, the combination with a hollow decoy constructed of light material, of means for preventing overturning of said decoy consisting of a light thin plate, having its edges turned upwardly, suspended in a horizontal position from said decoy by a flexible connection, for the purpose set forth.

14. As an article of manufacture, the combination with a decoy, of an anchor secured thereto comprising a thin strip having diagonal slits near one end, the lugs formed by said slits being bent to extend laterally from said strip, for the purpose set forth.

15. As an article of manufacture, the combination with a hollow decoy, of a string passing through a hole in said decoy and having its end secured by a strip of thin material pasted over the end of said string and said hole, for the purpose set forth.

In testimony whereof I have signed my name to this specification in the presence of two subscribing witnesses.

WHITTAKER RIGGS.

Witnesses:
J. R. STIEHL,
J. A. ROONEY.